May 15, 1956 — R. W. JENSEN — 2,745,425
SYSTEM AND APPARATUS FOR INFLATING OR DEFLATING PNEUMATIC VESSELS
Filed June 1, 1953 — 2 Sheets-Sheet 1

RAYMOND W. JENSEN, INVENTOR.

BY John H. J. Wallace

May 15, 1956 R. W. JENSEN 2,745,425
SYSTEM AND APPARATUS FOR INFLATING OR
DEFLATING PNEUMATIC VESSELS
Filed June 1, 1953 2 Sheets-Sheet 2

RAYMOND W. JENSEN,
INVENTOR.

BY John H. J. Wallace

United States Patent Office 2,745,425
Patented May 15, 1956

2,745,425

SYSTEM AND APPARATUS FOR INFLATING OR DEFLATING PNEUMATIC VESSELS

Raymond W. Jensen, Encino, Calif., assignor to The Garrett Corporation, Los Angeles, Calif., a corporation of California Application June 1, 1953, Serial No. 358,791

8 Claims. (Cl. 137—108)

The present invention relates generally to fluid control systems and relates more specifically to a fluid operated valve mechanism adapted for controlling, for example, inflation and deflation of pneumatic pressure vessels.

For effecting inflation and subsequent deflation of large pontoons for temporary or emergency bridges, or the like devices, there has been an increasing necessity for equipment for the control of fluid delivered to and from these devices. The equipment utilized for this purpose must necessarily be relatively light in weight and still be effective for the control of fluid under pressure so as to enable transportation of the equipment easily from place to place without the necessity for heavy duty moving equipment that is frequently incapable of traversing rough terrain.

Prior devices utilized for this purpose have been extremely heavy, thus restricting the means by which they may be transported and their usefulness. Additionally, this prior equipment was extremely costly, utilizing a considerable amount of expensive materials in the often numerous components. In a system for effecting such inflation and deflation, the requirement has also arisen for the provision of suitable mechanisms in the system whereby deflation of the vessel may also be accomplished under power, it being required that mechanism utilized to change the operating characteristics of the inflation-deflation device be easily operated, light in weight and efficient in operation.

It is therefore an important object of the present invention to provide an inflation-deflation mechanism to overcome the disadvantages of prior devices.

It is another object of the present invention to provide a novel inflation-deflation fluid control mechanism that is light in weight to facilitate transportation thereof, efficient and reliable in use, and relatively inexpensive to manufacture.

It is a further important object of the present invention to provide a novel fluid control valve mechanism for use in conjunction with an inflation-deflation device.

It is a still further object of the present invention to provide a novel inflation-deflation mechanism and system utilizing a suitable compressor, means being provided to protect the compressor and drive therefor when a device to be inflated has reached its maximum inflation or deflation point, and to further protect said compressor should any elements of the device fail to operate properly.

Another object of the present invention is to provide a novel inflation-deflation device and system that is extremely rugged in construction to enable use in combat or in other situations requiring rough handling.

It is still another object of the present invention to provide a pneumatic control valve mechanism incorporating a double acting valve member, a pneumatic actuator associated with the valve member, and a pressure regulator for controlling the flow of a motive gas to the pneumatic actuating mechanism.

Other and further important objects of the present invention will become apparent from the disclosures in the following detailed specification, appended claims and accompanying drawings, wherein:

Figure 1:
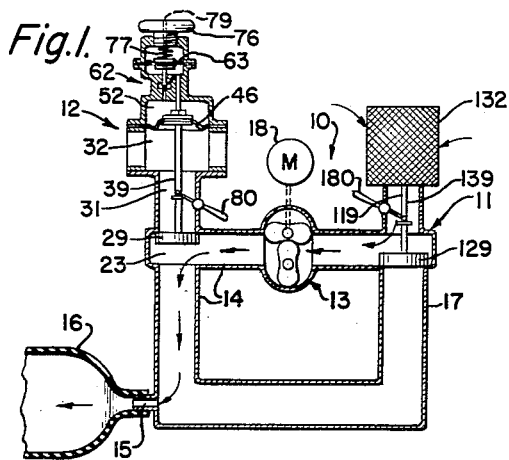
Fig. 1 is a schematic view showing the mechanism of the present inflation-deflation system in position for inflation of a pressure vessel.

Referring to the drawings, the inflation-deflation system of the present invention is shown in Fig. 1 as being indicated generally at 10. Broadly, the system includes an inlet valve 11, a fluid flow control valve and associated pressure regulating mechanism 12, and a suitable compressor 13. The valve member of the valve mechanism 12 is positioned in a conduit 14 extending intermediate the discharge side of the compressor 13 and the entrance 15 to a suitable inflatable structure 16 such, for example, as a pontoon. A second conduit 17 extends intermediate the entrance side of the compressor 13 and the inlet 15 to the structure 16, the inlet valve 11 being positioned in the conduit 17. The compressor 13 is adapted to be driven in any suitable manner as, for example, by a motor 18.

Figure 3:
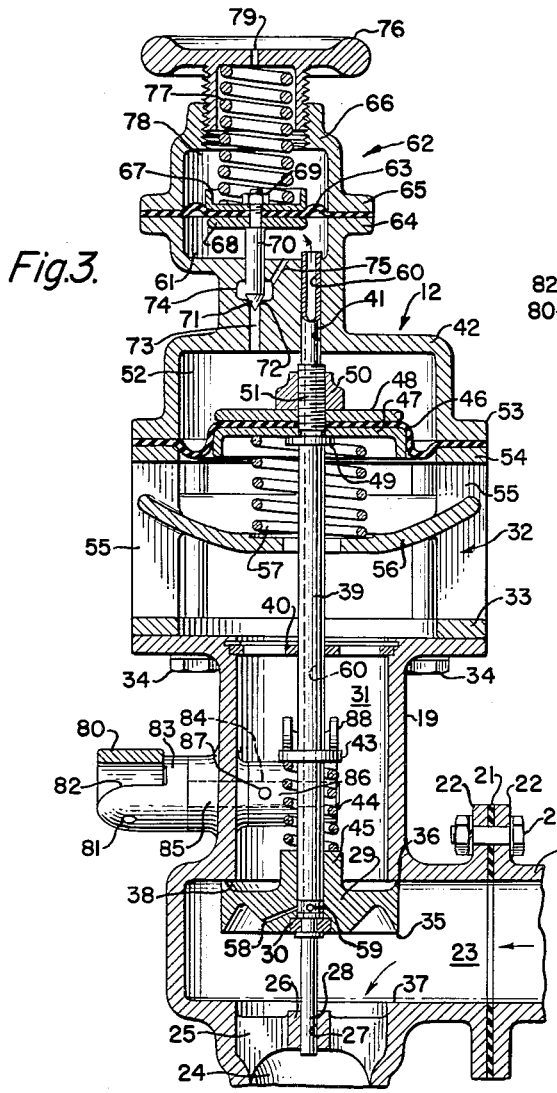
Fig. 3 is a transverse sectional view of a portion of the control valve mechanism utilized with the inflation-deflation system of Fig. 1.

With reference now primarily to Fig. 3, the valve mechanism 12 comprises a body structure 19 that is adapted to be secured to the conduit 14 as by suitable nuts and bolts 20, there being a sealing gasket 21 disposed intermediate a pair of flanges 22 on the conduit 14 and valve body 19 respectively. A passage 23 formed in the valve housing 19 is adapted to communicate with the conduit 14 extending from the valve mechanism 12 to the compressor 13. A branch passage 24 is adapted to connect the passage 23 and the portion of the conduit 14 extending from the valve mechanism 12 to the inlet 15 of the inflatable structure 16. A plurality of webs 25 is disposed inwardly from the walls of the passage 24 to support a suitable bearing collar 26 axially within the passage 24. The collar 26 has an axial bore 27 for the reception of a rod 28, the rod 28 being adapted to support a movable double acting valve member 29 as by contact therebetween with a collar 30 formed on the rod 28.

The housing 19 is further provided with a vertically extending passageway 31 to provide communication between the passage 23 and ambient atmosphere through radial openings 32 formed in a spacing member 33 secured to the upper end of the housing 19 as by suitable bolts 34. The valve member 29 has knife-edges 35 and 36 that are adapted to co-operate with valve seats 37 and 38 respectively, valve seat 37 being formed intermediate the passage 23 and the passage 24, and the valve seat 38 being formed intermediate the passage 23 and the passage 31.

The rod 28 has a hollow extension 39 which extends upwardly therefrom through a guide 40 positioned in the upper end of the passage 31, the upper end of said extension being positioned for reciprocal movement in a bore 41 formed in an actuator housing 42. A collar 43 is formed on the rod extension 39, a compression spring 44 being disposed about the rod extension 39 intermediate the collar 43 and the upper end 45 of the valve member 29 to thereby normally bias the valve member 29 against the supporting collar 30 while still permitting reciprocal movement of the valve member on the rod extension 39. The compression spring 44 acts to insure the engagement of the knife edge 35 with the seat 37 and to compensate for any production tolerances in the manufacture of the structure when the valve member 29 is moved in a closing direction.

The upper end of the rod extension 39 is adapted to support an actuator diaphragm 46 by means of a pair of diaphragm plates 47 and 48 positioned on opposite sides of the diaphragm and held in contact therewith by a collar 49 and a nut 50 adapted to engage suitable threads 51 formed on the outer surface of the rod extension 39. A chamber 52 is thus formed intermediate the actuator housing 42 and the diaphragm 46, the outer periphery of the diaphragm 46 being retained between a flange 53 formed on the actuator housing 42 and an upper ring member 54 of the spacer 33. A plurality of vertically extending webs 55 formed in the periphery of the spacer 33 are adapted to support an annular disk-shape web 56, a compression spring 57 being disposed intermediate the web 56 and the diaphragm plate 47. The compression spring 57 acts through the rod extension 39 to normally maintain the valve member 29 in the position shown in Fig. 3, the knife-edge 36 being normally in contact with the valve seat 38. There is thus provided a normally open valve mechanism to provide free communication between the discharge part of the compressor 13 and the inlet 15 to the inflatable structure 16.

The valve member 29 is provided with a radially extending bore 58 that communicates with the passage 24 and conduit 14 and is thereby adapted to sense the pressure in the structure 16 by way of the conduit 14 and passage 24. The inner end of the bore 58 communicates with a plurality of radially extending ports 59 formed in the lower end of the rod extension 39 and communicating with an axial bore 60 formed in the rod extension 39.

The bore 60 provides means for effecting communication between the bore 58 and a chamber 61 of a suitable pressure regulator indicated generally at 62. The chamber 61 is formed in the upper portion of the actuator body 42, a pressure regulator diaphragm 63 providing a movable wall for one side of the chamber 61. The diaphragm 63 has its outer periphery secured between a flange 64, formed on the upper end of the actuator body 42, and a flange 65 formed in a pressure regulator cap member 66. A pair of diaphragm plates 67 and 68 are arranged on the upper and lower surfaces of the diaphragm 63 respectively and secured thereto as by a nut 69 threadably engaging one end of a metering pin 70. The lower end of the metering pin 70 is provided with a conical valve structure 71 that is adapted to co-operate with a valve seat 72 formed at one end of a bore 73. The bore 73 connects the chamber 52 and an enlarged opening 74, formed about the lower end of the valve pin 70, there being a bore 75 provided between the enlarged opening 74 and the chamber 61 formed by the upper end of the actuator housing 42 and the diaphragm 63. Thus, upon movement of the diaphragm 63, fluid under pressure will be admitted from the axial bore 60, formed in the rod extension 39, into the chamber 61, and from the chamber 61 to the chamber 52 by way of the bores 75 and 73.

An adjusting wheel or handle 76 is threadably engaged in the upper end of the pressure regulator cap 66 and supports one end of a compression spring 77 the other end of the compression spring being adapted to bear against the diaphragm plate 67. A chamber 78 formed by the diaphragm 63 and the pressure regulator cap 66 is vented to atmosphere through an orifice 79 formed axially in the adjusting handle 76.

Figure 4:
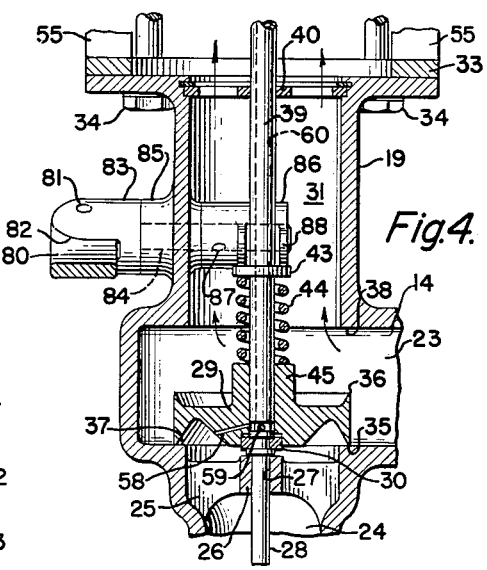
Fig. 4 is a fragmentary sectional view of a portion of the valve mechanism shown in Fig. 3 with the parts therein arranged in the deflation position.
Figure 7:
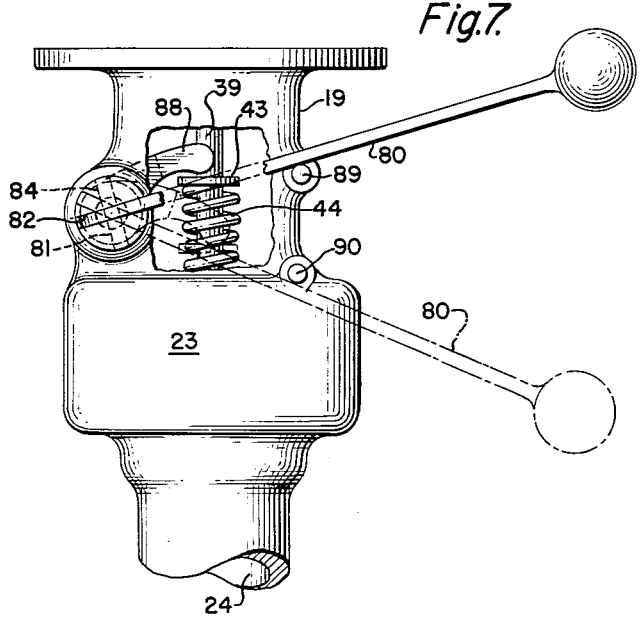
Fig. 7 is a fragmentary side elevational view partially cut away and showing the manual valve actuating means utilized in the system of Fig. 1.

In order to move the valve member 29 from the normally open position shown in Fig. 3 to the normally closed position shown in Fig. 4, and to manually lock the valve member 29 in the normally closed position, a lever 80, Figs. 3 and 7, is mounted on a pin 81 and is arranged in a slot 82 formed in an enlarged end 83 of a shaft 84. The shaft 84 is journaled in a bearing structure 85 and extends into the interior of the passage 31. A collar 86 is secured to the inner end of the shaft 84 as by a suitable pin 87. A bifurcated crank lever 88 is formed outwardly from the collar 86, the outer ends thereof being adapted to engage the upper surface of the collar 43 formed on the rod extension 39. A pair of pins 89 and 90 extend outwardly from the external surface of the valve housing 19 to normally be engaged by the lever 80 to hold the lever 80 in either the upper or lower position as indicated by the solid and dotted lines respectively in Fig. 7. Upon movement of the lever 80 to the position shown by the dotted lines in Fig. 7, the rod extension 39 will move downwardly thus carrying the valve member 29 downwardly and positioning the knife-edge 35 in engagement with the valve seat 37 as shown primarily in Fig. 4, the purpose of this manual movement of the valve member 29 to be further described hereinafter.

Figure 5:
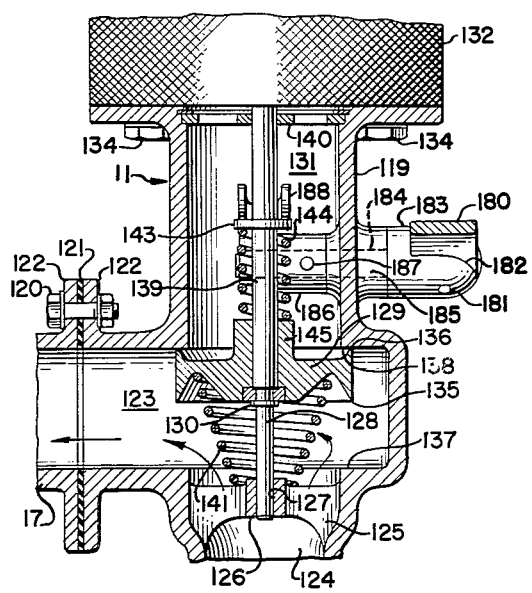
Fig. 5 is a fragmentary sectional view showing another of the control valves of the system of Fig. 1 in the deflating position.
Figure 6:
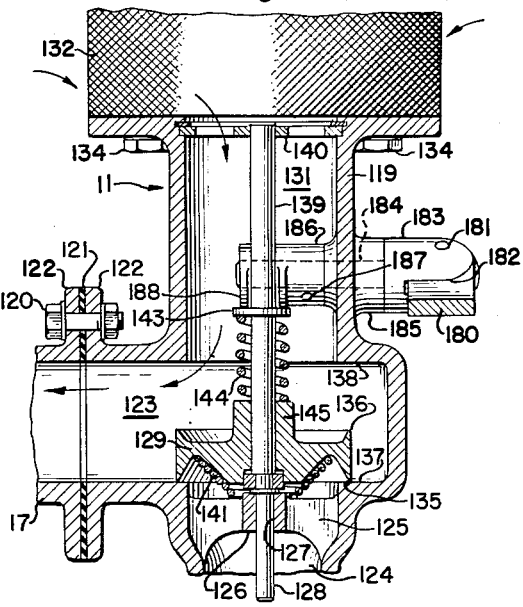
Fig. 6 is a fragmentary sectional view similar to Fig. 5 and showing the valve mechanism of Fig. 5 with components in the inflating position.

The inlet valve 11, as shown in detail in Figs. 5 and 6, comprises a valve housing 119 that is secured to the conduit 17 by suitable nuts and bolts 120 extending through a sealing gasket 121 disposed between flanges 122 formed on the facing ends of the housing 119 and conduit 17 respectively.

A passage 123 is formed in the body of the valve housing 119, this passage normally communicating with a passage 124 formed in communication with the conduit 17 between the inflatable structure 16 and the passage 123. A plurality of spaced webs 125 extends inwardly from the walls of the passage 124 to axially support a bearing sleeve 126 having a suitable bore 127 to slidably support a rod 128. A valve member 129 is positioned on the rod 128 by engagement with a collar 130 formed on the rod 128.

A second passage 131 provides a communication between ambient atmosphere and the passage 123 and is formed in the upper portion of the valve housing 119. An inlet filter screen structure 132 is secured to the upper portion of the valve body 119 as by suitable bolts 134 to provide a means for filtering air to be delivered through the compressor 13 by way of the inlet valve 11.

The valve member 129 has knife edges 135 and 136 that are adapted to co-operate with valve seats 137 and 138 formed intermediate the passage 24 and passage 123 and intermediate the passage 123 and passage 131 respectively. The valve member 129 is further slidably disposed on a rod extension 139 this extension being slidably journaled, at the upper end thereof, in a suitable guide member 140.

The valve member 129 is normally biased with the knife edge 136 in engagement with the seat 138, as shown in Fig. 5, by means of a suitable compression spring 141 positioned between the webs 125 and the lower face of the valve member 129. A collar 143 formed on the rod extension 139 in spaced relationship with the upper portion of the valve member 129 is adapted to support one end of a compression spring 144, the other end being adapted to bear against the upwardly extending portion 145 of the valve member 129.

For manual movement of the valve member 129 from the position for deflation shown in Fig. 5 to the position for inflation shown in Fig. 6, a lever 180 is provided, this lever being pivotally mounted on a pin 181 and in a slot 182 formed in an enlarged portion 183 of a suitable shaft 184.

The shaft 184 extends inwardly through a bearing 185 formed in the body of the inlet valve and has a collar 186 secured to the inner end thereof as by a suitable pin 187. A bifurcated crank lever 188 extends outwardly from the collar 186 and has an outer end portion adapted for engagement with the collar 143 formed on the rod extension 139, the construction being such that upon movement of the lever 180 from the position shown in Fig. 5 to the position shown in Fig. 6, the collar 143 together with the rod extension 139 and the valve member 129, will be moved in a direction to compress the compression spring 141 and move the knife edge 135 into engagement with the valve seat 137. When in the closed or inflation position, as shown in Fig. 6, the compression spring 144 acts to insure the seating of the knife edge 135 in engagement with the seat 137 and to compensate for any loss in production tolerances in the manufacture of the valve structure.

It is also to be noted that the manual operating mechanisms associated with the valve members 29 and 129 are substantially identical, the details of the external construction being shown in Fig. 7.

In operation, and with reference to Fig. 1, for inflation of the inflatable structure 16, ambient atmospheric air will be drawn into the system through the screen filter 132, through the passage 131 and past the valve member 129, the valve member being in the lowermost or inflation position as shown also in Fig. 6, the conduit 17 leading from the inlet valve 11 to the inlet 15 of the inflatable structure 16 being normally closed by the valve member 129. From the compressor 13, air will be delivered through the conduit 14, past the flow control valve 29 and into the structure 16, the valve member 29 being in the normally open position shown additionally in Fig. 3 to enable fluid flow from the conduit 14 through the passages 23 and 24 and into the downstream portion of the conduit 14. The fluid pressure within the structure 16, and consequently within the passage 14 is being sensed through the bore 58 and axial bore 60 in the valve member 29 and rod extension 39 respectively, and will be delivered to the chamber 61 of the pressure regulator 62. When this fluid pressure reaches or exceeds a predetermined value, it causes upward movement of the diaphragm 63 in a direction to compress the calibration spring 77. In this connection, it is to be noted that the fluid pressure, which causes movement of the diaphragm 63, is determined by the adjustment of the handle 76 and the consequent compression or expansion of the spring 77. In other words, the fluid pressure must overcome the force of spring 77. Upon upward movement of the diaphragm 63, the conical valve tip 71 will be opened thereby providing communication between the chamber 61 and actuator chamber 52 to raise the pressure in the chamber 52 and move the diaphragm 46 downwardly. This in turn causes movement of the rod extension 39 and valve member 29 downwardly, as seen in Fig. 3, and in a direction to move the knife edge 35 into engagement with the valve seat 37 to thereby close the passage 14 and prevent communication with the discharge of the compressor 13. As soon as diaphragm 46 starts moving downwardly, the knife edge 36 will leave its associated seat 38 to thereby vent the compressor discharge to atmosphere by way of the passages 23 and 31 and the radial ports 32. This simultaneous venting of the compressor discharge acts to prevent a back pressure load from being delivered to the discharge of the compressor which would normally increase the load on its driving motor 18.

Figure 2:
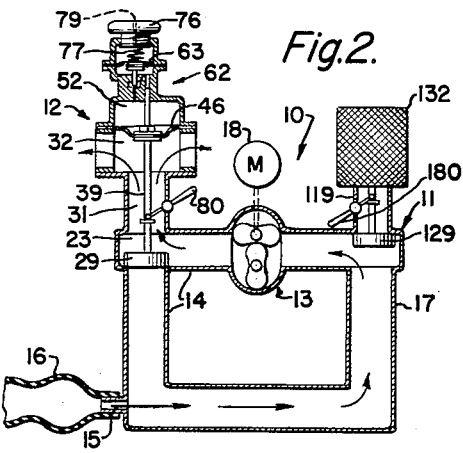
Fig. 2 is a schematic view similar to Fig. 1 and showing the mechanism in position for deflation of the vessel.

In order to effect deflation of structure 16, the valve members 29 and 129 are manually moved to the positions shown primarily in Figs. 2, 4, and 5 by means of the levers 80 and 180 respectively to thereby close communication between the discharge of the compressor 13 and the structure 16 and to open the passage 17 leading from the structure 16 to the inlet of the compressor 13. Simultaneously, the passage 31 is opened to compressor discharge to thereby permit the compressor discharge to flow directly to atmosphere. The deflation of the inflatable structure 16 may thereby be accelerated by means of the suction of the compressor 13 to insure rapid and complete exhaustion of the compressed fluid in the structure. It is to be noted that, upon complete deflation of the structure 16, the valve member 129 will act as a relief valve and will leave the seat 138 to permit the circulation of the fluid from the inlet screen 132 through the passage 131, passage 17, through the compressor and out through the passages 23 and 31 to atmosphere again providing means to protect the driving motor 18 as previously described.

I claim:

1. In an automatic system selectively adapted for inflation or deflation of a space: a driven compressor; first conduit means extending from the discharge of said compressor to a space to be inflated, said first conduit having an outlet communicating with the atmosphere; a first valve means disposed in said first conduit means, said first valve normally being positioned to close said outlet and movable to a position to open said outlet and close the conduit leading to the space to be inflated; second conduit means extending from said space to the inlet of said compressor, said second conduit also communicating with atmosphere; an inlet valve positioned in said second conduit means, said inlet valve being manually movable into open or closed positions to thereby selectively connect said inlet of said compressor with said space or with atmosphere; and pressure responsive means associated with said first valve means and adapted to move said first valve means in response to a predetermined pressure in said space to vent the discharge of said compressor to atmosphere.

2. In an automatic system selectively adapted for inflation or deflation of a space: a driven compressor; first conduit means extending from the discharge of said compressor to a space to be inflated, said first conduit means having an outlet communicating with the atmosphere; a first valve means disposed in said first conduit means, said first valve normally being positioned to close said outlet and movable to a position to open said outlet and close the conduit extending to the space to be inflated; second conduit means extending from said space to the inlet of said compressor, said second conduit also communicating with atmosphere; an inlet valve positioned in said second conduit means, said inlet valve being manually movable into open or closed positions to thereby selectively connect said inlet of said compressor with said space or with atmosphere; and a pressure regulator responsive to the pressure in said space, associated with said first valve means and adapted to move said first valve means in response to a predetermined pressure in said space and to simultaneously permit venting of the discharge of said compressor to atmosphere.

3. An inflation-deflation system comprising, in combination: a driven compressor; a first passage extending from the discharge side of said compressor to a space to be inflated, said first passage having an outlet communicating with the atmosphere; a control valve disposed for movement in said first passage; means to move said valve to a position to close said outlet and cause the discharge from said compressor to flow to the space to be inflated; a second passage interconnecting the entrance side of said compressor, said first passage, the atmosphere and said space; an inlet valve positioned for movement in said second passage; means to move said inlet valve to close said second passage and to permit communication between said compressor entrance and atmosphere; and a pressure regulator associated with said control valve, said pressure regulator being responsive to pressure within said first passage and adapted to cause movement of said control valve to close said first passage and to simultaneously vent said compressor discharge to atmosphere.

4. A selective inflation-deflation system comprising, in combination: a driven compressor; a first passage extending from the discharge side of said compressor to a space to be inflated, said first passage having an outlet communicating with the atmosphere; a control valve positioned for movement in said first passage; means to move said valve to a position to close said outlet; a second passage interconnecting the entrance side of said compressor, said first passage, the atmosphere and said space; a normally open vacuum relief inlet valve positioned in said second passage; means to move said inlet valve to close said second passage and to permit communication between said compressor entrance and atmosphere; a pressure regulator associated with said control valve, said pressure regulator being responsive to the pressure within said first passage and adapted to cause movement of said control valve to close said first passage and to simultaneously vent said compressor discharge to atmosphere.

5. A selective inflation-deflation system comprising, in combination: a driven compressor; a first passage extending from the discharge side of said compressor to a space to be inflated, said first passage having an outlet communicating with the atmosphere; a control valve positioned for movement in said first passage, said control valve being normally disposed to close said outlet; means to manually move said control valve to a position to open said outlet; a second passage interconnecting the entrance side of said compressor, said first passage, the atmosphere and said space; an inlet valve positioned in said second passage; means to move said inlet valve to close said second passage and to permit communication between said compressor entrance and atmosphere; a pressure regulator associated with said control valve; means to transmit the pressure in said first passage to said pressure regulator; a control valve actuator; and valve means operable by said pressure regulator to permit fluid flow to said actuator when a predetermined pressure is reached in said first passage to thereby cause movement of said control valve to close said first passage and to simultaneously vent said compressor discharge to atmosphere.

6. A selective inflation-deflation system comprising, in combination: a driven compressor; a first passage extending from the discharge side of said compressor to a space to be inflated, said passage having an outlet communicating with the atmosphere; a control valve positioned for movement in said first passage, said control valve being normally disposed to close said outlet; means to manually move said control valve to a position to open said outlet and close the passage to the space to be inflated, a second passage interconnecting the entrance side of said compressor, said first passage, a source of fluid and said space; a vacuum relief valve positioned for movement in said second passage; means to move said vacuum relief valve to close said second passage and to permit communication between said compressor entrance and said source of fluid; a pressure regulator associated with said control valve; means to transmit the pressure in said first passage to said pressure regulator; a control valve actuator; valve means operable by said pressure regulator to permit fluid flow to said actuator when a predetermined pressure is reached in said first passage to thereby cause movement of said control valve to close said first passage and to simultaneously vent said compressor discharge to atmosphere.

7. A selective inflation-deflation system comprising, in combination: a driven compressor; a first passage extending from the discharge side of said compressor to a space to be inflated, said passage having an outlet communicating with the atmosphere; a control valve positioned for movement in said first passage; a second passage interconnecting the entrance side of said compressor, said first passage, the atmosphere and said space; a vacuum relief inlet valve positioned for movement in said second passage; manually operable means to move said inlet valve to close said second passage and to permit communication between said compressor entrance and atmosphere; filter means intermediate atmosphere and said compressor entrance; a pressure regulator associated with said control valve; means to transmit the pressure in said first passage to said regulator; a control valve actuator operably associated with said pressure regulator; valve means operable by said valve actuator to permit fluid flow when a predetermined pressure is reached in said first passage to thereby cause movement of said control valve to close said first passage and to simultaneously vent said compressor discharge to atmosphere; and manually operable means operative independently of said control valve actuator to close said control valve and permit said compressor discharge to be vented to atmosphere.

8. In an automatic system selectively adapted for the inflation or deflation of a space: a driven compressor; first conduit means extending from the discharge of said compressor to a space to be inflated, said passage having an outlet communicating with the atmosphere; a first valve means disposed for movement in said first conduit means, said first valve means being movable to a position to close the conduit to the space to be inflated and open said outlet; second conduit means extending from said space to the inlet of said compressor, said second conduit communicating with the atmosphere; an inlet valve positioned in said second conduit means; means for moving said inlet valve between open and closed positions thereby to selectively connect said inlet of said compressor with said space or with atmosphere; and pressure responsive means associated with said first valve means and adapted to close said first valve means in response to a predetermined pressure in said space and to vent the discharge of said compressor to atmosphere.

References Cited in the file of this patent
UNITED STATES PATENTS

| Re. 23,015 | Yingling | July 6, 1948 |
| 1,247,884 | Scovel | Nov. 27, 1917 |
| 1,288,578 | Hatfield et al. | Dec. 24, 1918 |

FOREIGN PATENTS

| 566,205 | France | Feb. 11, 1924 |